United States Patent [19]

Nedez et al.

[11] Patent Number: 6,080,379

[45] Date of Patent: Jun. 27, 2000

[54] ALUMINA-BASED CATALYST FOR THE TREATMENT OF GASES CONTAINING SULPHUR COMPOUNDS, USE OF THESE CATALYSTS FOR THE TREATMENT AND PROCESSES FOR TREATMENT OF THE SAID GASES

[75] Inventors: Christophe Nedez, Asnieres sur Seine; Olivier Legendre, Herblay, both of France

[73] Assignee: Institut Francais du Petrole, Rueil-Malmaison Cedex, France

[21] Appl. No.: 08/890,950

[22] Filed: Jul. 10, 1997

Related U.S. Application Data

[63] Continuation of application No. 08/500,062, Jul. 10, 1995, abandoned.

[30] Foreign Application Priority Data

Jul. 13, 1994 [FR] France .................................. 94 08745

[51] Int. Cl.⁷ .............................. C01B 17/04; B01J 23/00
[52] U.S. Cl. ........................ 423/511; 502/355; 502/332; 502/304; 502/305; 502/306; 502/302; 502/337; 502/338; 502/341; 502/352; 502/240
[58] Field of Search ............................ 423/511; 502/355, 502/332, 304, 305, 306, 302, 337, 338, 341, 352, 240

[56] References Cited

U.S. PATENT DOCUMENTS 5,100,857  3/1992  Sato et al. .............................. 502/335

FOREIGN PATENT DOCUMENTS

| 0 115 449 | 8/1984 | European Pat. Off. . |
| 0 584 369 | 3/1994 | European Pat. Off. . |
| 0 692 305 | 7/1995 | European Pat. Off. . |
| 1 178 168 | 5/1959 | France . |
| 1 400 365 | 7/1975 | France . |
| 2 080 273 | 2/1982 | United Kingdom . |

Primary Examiner—Elizabeth D. Wood
Attorney, Agent, or Firm—Burns, Doane, Swecker & Mathis, L.L.P.

[57] ABSTRACT

The invention relates to a catalyst for the treatment of gases containing sulphur compounds, using the Claus reaction or using hydrolysis, which is made up of alumina-based porous particles and characterized in that the cumulative volume created by all the pores whose diameter is greater than 0.1 $\mu$m, $V_{0.1}$, is greater than 12 ml/100 g of catalyst and in that the cumulative volume created by all the pores whose diameter is greater than 1 $\mu$m, $V_1$, is such that the ratio $V_1/V_{0.1}$ is higher than or equal to 0.65. This catalyst can be employed for the treatment of gases containing sulphur compounds by using the Claus reaction, or of gases containing organic sulphur compounds by using a hydrolysis reaction.

33 Claims, 1 Drawing Sheet

ALUMINA-BASED CATALYST FOR THE TREATMENT OF GASES CONTAINING SULPHUR COMPOUNDS, USE OF THESE CATALYSTS FOR THE TREATMENT AND PROCESSES FOR TREATMENT OF THE SAID GASES

This application is a continuation of application Ser. No. 08/500,062 filed Jul. 10, 1995, and now abandoned.

BACKGROUND OF THE INVENTION

1. Field of the Invention

The present invention relates to a catalyst for the treatment of gases, especially of industrial gaseous effluents, with a view to the production of elemental sulphur.

2. Description of the Related Art

The chief catalysed reactions ordinarily used for this purpose are the Claus reaction and the hydrolysis reaction of organic sulphur compounds, involved in the industrial process for the production of sulphur, known as the Claus process.

This process enables sulphur to be prepared from hydrogen sulphide in two steps.

In the first step the hydrogen sulphide is burnt in the presence of a controlled quantity of air to convert a proportion of the hydrogen sulphide into sulphur dioxide according to the following reaction (1):

$$H_2S + 3/2 O_2 \rightarrow H_2O + SO_2 \qquad 1)$$

Then, in the second step, the gaseous mixture obtained in the first step is passed through converters in series, each containing a catalyst bed for carrying out the Claus reaction (2) itself.

$$2H_2S + SO_2 \rightarrow 3/x\ S_x + 2H_2O \qquad 2)$$

The overall balance of the reaction is therefore (3)

$$3H_2S + 3/2 O_2 \rightarrow 3/x\ S_x + 3H_2O \qquad 3)$$

On leaving the converters the gas still contains sulphur compounds which are oxidized into $SO_2$ before being discharged.

Besides hydrogen sulphide, the gas treated according to the Claus process generally contains hydrocarbons, water and carbon dioxide which, by reaction with hydrogen sulphide, form organic sulphur compounds such as carbon oxysulphide COS or carbon disulphide $CS_2$.

These compounds are either already present in the gas to be treated or are formed during the first oxidation step, conducted at elevated temperature.

They are generally stable in the catalytic converters and are therefore very inconvenient because they contribute to an increase of 20 to 50% in the discharges of $SO_2$ and of sulphur compounds into the atmosphere after combustion of the fumes.

These compounds can be removed, especially by hydrolysis according to reactions (4) and (5)

$$COS + H_2O \rightarrow CO_2 + H_2S \qquad 4)$$

$$CS_2 + 2H_2O \rightarrow CO_2 + 2H_2S \qquad 5)$$

These reactions are also performed on a catalyst bed and generally take place simultaneously with the Claus reaction in the converters, making use of the same catalysts, which are generally based on alumina or titanium, cerium, silicon or zirconium oxides.

As in the case of any other catalytic reaction, attempts are made to develop ever more efficient catalysts which make it possible especially to end with the highest possible conversions.

In particular, in this case of heterogeneous catalysis, the reaction is controlled by the diffusion of the reactants in the catalyst bed, so that the particle size and the macroporosity of the catalyst particles are of importance.

SUMMARY OF THE INVENTION

The aim of the invention is to provide an active alumina-based catalyst for the treatment of gases containing sulphur compounds, the performance of which is improved as a result of an optimized macroporosity.

To this end the subject of the invention is a catalyst for the treatment of gases containing sulphur compounds, using the Claus reaction or using hydrolysis, which is made up of alumina-based porous particles and characterized in that the cumulative volume created by all the pores whose diameter is greater than 0.1 μm, written as $V_{0.1}$, is greater than 12 ml/100 g of catalyst and in that the cumulative volume created by all the pores whose diameter is greater than 1 μm, written as $V_1$, is such that the ratio $V_1/V_{0.1}$ is higher than or equal to 0.65.

DETAILED DESCRIPTION OF THE BEST MODE AND PREFERRED EMBODIMENTS OF THE INVENTION

The present inventors have found that, especially when the particle size, the surface and the surface chemistry characteristics are fixed, the shape of the pore volume distribution of the alumina-based catalysts determines the catalytic activity.

The pore volume distribution can be represented by the variation in the cumulative volume created by all the pores of size greater than a given diameter, as a function of this pore diameter.

It is thus determined which pore sizes contribute predominantly to the creation of volume in the catalytic material.

The inventors have established that the determining pore region is situated between 0.1 and 1 μm and that the catalysts of a porosity such that the cumulative volume created by all the pores of diameter greater than 1 μm is relatively high reveal properties which are quite special and a performance which is superior to the known catalysts of the prior art.

The catalysts of the invention thus have a volume $V_{0.1}$ greater than 12 ml/100 g of catalyst and a volume $V_1$ of at least 0.65 times $V_{0.1}$.

$V_{0.1}$ is preferably greater than 14 ml/100 g of catalyst and $V_1$ is preferably at least 0.70 times $V_{0.1}$.

An alumina-based catalyst according to the invention may contain, by weight, from 0.5 to 100%, and preferably from 60 to 99%, of alumina.

It is possible, in particular, to employ hydrated alumina compounds such as hydrargillite, bayerite, boehmite, pseudoboehmite and amorphous or essentially amorphous alumina gels. It is also possible to make use of the dehydrated or partially dehydrated forms of these compounds, which consist of transition aluminas and which contain at least one of the phases taken from the group consisting of rho, chi, eta, gamma, kappa, theta, delta and alpha.

In particular it will be possible to use especially aluminas obtained by one of the following processes, optionally after grinding and screening of the particles:

by precipitating an aqueous solution of an aluminium salt with a solution of an alkali metal aluminate, the precipitate obtained is atomized and is then resuspended in an aqueous solution which has a pH of between 4.5 and 7, the alumina slurry obtained is atomized and dried and the product is then washed, dried and calcined. (Process described in U.S. Pat. No. 3,520,654);

by precipitation of an alumina gel at a pH of between 7.5 and 11, washing, dewatering, resuspending, rapid dehydration of the product in a stream of hot gases at an entry temperature of between approximately 350 and 1000° C. and then calcining. (Process described in Patent FR 2 221 405);

by precipitation of an alumina gel at a pH of between 7 and 10.5, maturing of the precipitate at a pH of between 10 and 11, homogenizing and atomization at 250–550° C. of the slurry obtained, and then calcining. (Process described in Patent GB 888 772);

by precipitation of an alkali metal aluminate with an inorganic acid at a temperature of between 30 and 75° C., maturing in a second reactor at 35–70° C. at a pH close to 7, recycling the slurry obtained into the mixing reactor, filtration, washing, spray-drying the product and then calcining. (Process described in U.S. Pat. No. 3,630,670);

by rapid dehydration of aluminium hydroxides or oxyhydroxides and, more particularly, of hydrargillite in a stream of hot gases; this dehydration being carried out in any kind of suitable apparatus with the aid of a stream of hot gases, the entry temperature of the gases in the apparatus generally varying approximately from 400 to 1200° C., the contact time of the hydroxide or oxyhydroxide with the hot gases being generally between a fraction of a second and 4–5 seconds; such a process for the preparation of active alumina powder has been described especially in French Patent No. 1 108 011;

by treatment in an aqueous medium which has a pH lower than 9 of an active alumina powder obtained by rapid dehydration of hydrargillite in a stream of hot gases, spray-drying and then calcining (process described in European Patent Application No. 15 196).

The alumina may be employed by itself or mixed with one or more other oxides such as silica, titanium oxide, zirconium oxide, cerium oxide, tin oxide, trivalent rare-earth oxides, molybdenum oxide, cobalt oxide, nickel oxide, iron oxide or the like.

The oxides other than alumina may represent from 0 to 40% of the weight of the catalyst.

It should be noted that titanium, cerium, zirconium or silicon oxides are themselves catalytically active in the treatment of gases containing sulphur compounds involving a Claus reaction or hydrolysis.

The catalysts of the invention may, in addition, include one or more constituents chosen from clays, silicates, alkaline-earth metal or ammonium sulphates, ceramic fibres and asbestos.

They may also include additives for improving the forming and additives for improving their final mechanical properties.

Additives which may be mentioned by way of example are especially cellulose, carboxymethyl cellulose, carboxyethyl cellulose, tallol, xanthan gums, surface-active agents, flocculating agents such as polyacrylamides, carbon black, starches, stearic acid, polyacrylic alcohol, polyvinyl alcohol, biopolymers, glucose, polyethylene glycols and the like.

The porous catalyst particles of the invention may be prepared by any known process for agglomerating or forming a powder containing alumina and optionally other ingredients chosen from those mentioned above.

The formed particles may be especially in the form of beads or monoliths or may have various forms which are accessible by extrusion. It is also possible to prepare the catalyst by agglomerating a powder containing alumina by any forming process and then by crushing the agglomerates thus obtained. The crushed particles do not then exhibit any particular shape.

However, the catalysts which are preferred are in the form of beads whose diameter is from 1.5 to 10 mm and more particularly from 3 to 7 mm.

The forming of the particles may take place directly on the catalyst powder or else on an inorganic paste obtained from the catalyst powder to which water, in particular, is added.

Thus, any known technique for shaping a powder or a paste, such as pelleting, extrusion or granulation, may be used for preparing the catalyst.

The adjustment of the characteristic porosity of the catalysts of the invention then takes place during this step of forming the catalyst particles.

Depending on the method employed for the forming, a person skilled in the art can modify different operating parameters in a known manner in order to impose the desired porosity.

Thus, the catalyst may be manufactured, for example, in the form of beads by granulation in a suitable forming apparatus, for example a coater such as a rotating coater or a drum. The porosity will be fixed in particular by a suitable adjustment of the entry flow rate of the catalyst powder and possibly of water, of the rate of rotation of the apparatus, or when a forming initiator is introduced.

In the case where catalyst particles are manufactured by extrusion, the adjustment of the porosity will be done similarly in the step of blending of the catalyst powder before the actual forming.

Pore-forming agents which disappear completely on heating and thus create the required macroporosity may also be added to the catalyst powder before the forming. Pore-forming compounds employed which may be mentioned by way of example are wood flour, charcoal, sulphur, tars, plastics or plastics emulsions such as polyvinyl chloride, polyvinyl alcohols, naphthalene, or the like. The quantity of pore-formers is not critical and is determined by the desired macropore volume.

The catalysts exhibiting the macroporosity characteristics according to the invention are highly effective both for catalysing the Claus reaction (equation (2)) and the hydrolysis reactions of organic sulphur compounds (equations (4) and (5)).

Another subject of the invention is therefore the use of a catalyst as described above for treating gases containing sulphur compounds with a view to the production of elemental sulphur by making use of the Claus reaction and for treating gases containing organic sulphur compounds by making use of a hydrolysis reaction.

Finally, other subjects of the invention are processes for the treatment of gases containing sulphur compounds by making use of the Claus reaction or by hydrolysis, by passing these gases over a catalyst bed, characterized in that at least a portion of the catalyst consists of a catalyst as described above.

The following examples and the attached FIGS. 1 and 2 illustrate the invention.

(a) correspond to an $O_2$ content of 10 ppm and a contact time of 2 seconds with the fresh catalysts.

Conditions (b) correspond to an $O_2$ content of 200 ppm and a contact time of 3 seconds with the fresh catalysts.

Conditions (c) correspond to an $O_2$ content of 200 ppm and a contact time of 3 seconds with the severely aged catalysts (that is to say that their specific surface is lowered to 120 $m^2/g$ of catalyst).

EXAMPLE 1

Alumina-based catalysts of the same composition, exhibiting a sodium content (expressed as weight of $Na_2O$) of 2000 ppm by weight, are formed by granulation to obtain beads between 3.1 and 6.3 mm in diameter, the macroporosity being varied so that the volume $V_{0.1}$ varies from 8 to 20 ml/100 g of catalyst and so that the ratio $V_1/V_{0.1}$ varies from 0.4 to 0.8.

These catalysts are tested as catalyst in the first reactor ($R_1$) and in the second reactor ($R_2$) in a Claus process.

In $R_1$ the reaction which is crucial, being the most difficult one to complete, is the reaction of hydrolysis of COS and, above all, of $CS_2$. In $R_2$ the lower temperature and the lower $H_2S$ content make the traditional Claus reaction more discriminating, as a result of the more preoccupying problems linked with the sulphate formation in the alumina.

The trends found in hydrolysis of the $CS_2$ in $R_1$ and in the Claus reaction in $R_2$, always recur: if a catalyst A is more efficient than a catalyst B in $R_1$, then A is also more efficient than B in $R_2$.

Accordingly, only results for catalysis of hydrolysis of $CS_2$, in condition $R_1$, are reported here.

Catalysis tests were therefore conducted by bringing into contact with the catalysts a gas to be treated whose volume composition is the following:

| | |
|---|---|
| $H_2S$ | 6% |
| $SO_2$ | 4% |
| $CS_2$ | 1% |
| $H_2O$ | 30% |
| $N_2$ | 59% |

The contact is produced in a reactor at 320° C., operating isothermally, with a variable oxygen content and with variable contact times.

The performances of the different catalysts are compared for an identical reactor volume filled with catalyst and an identical entry flow rate of gas to be treated, by measuring the hydrolysis activity and by analysing, using gas phase chromatography, the $H_2S$, $SO_2$, COS and $CS_2$ which are present in the gases leaving the reactor.

The $CS_2$ conversion is thus measured after a steady state is obtained with respect to the content of reaction products leaving the reactor.

The $CS_2$ conversion corresponding to the catalyst employed is measured in the case of each catalyst test.

Table 1 below summarizes the conversions measured for four catalysts employed in conditions (a), (b) and (c), which differ in their $V_{0.1}$ value, with a constant $V_1/V_{0.1}$ ratio.

TABLE 1

| | $CS_2$ conversion (%) | | |
|---|---|---|---|
| $V_{0.1}$ (ml/100 g) | (a) | (b) | (c) |
| 9 | 28 | 40 | 33 |
| 12 | 43 | 60 | 47 |
| 13.5 | 49 | 65 | 51 |
| 20 | 55 | | 57 |

Figure 1:
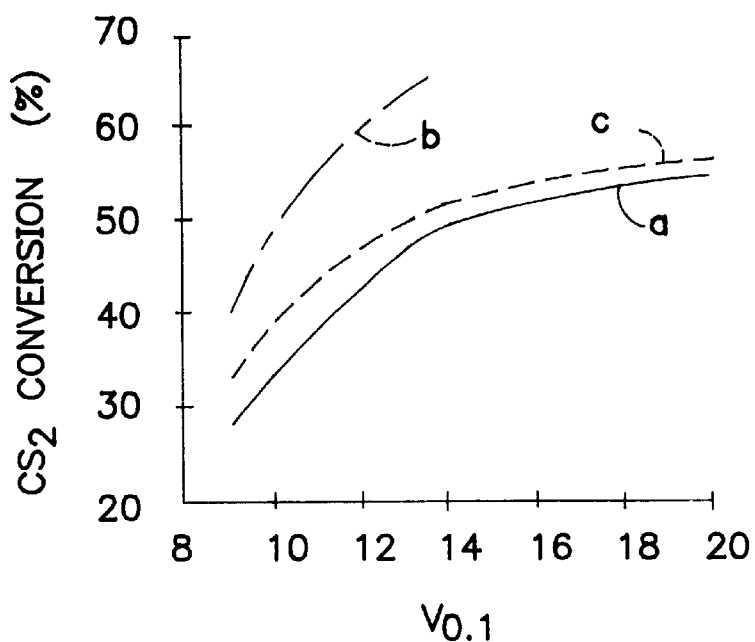
FIGS. 1 and 2 illustrate the variation in the catalytic efficiency of an alumina-based catalyst as a function of its macroporosity characteristics, $V_{0.1}$ in the case of FIG. 1 and $V_1//V_{0.1}$ in the case of FIG. 2, for three different operating conditions (a), (b) and (c).

The graph in FIG. 1 shows the variation in $CS_2$ conversion as a function of the volume $V_{0.1}$ with a constant $V_1/V_{0.1}$ ratio, in conditions (a), (b) and (c).

It is found, for example, that in conditions (a) the $CS_2$ conversion is relatively low if the pore volume at 0.1 micron, $V_{0.1}$, of the catalyst is lower than 12 ml/100 g. The conversion increases with $V_{0.1}$ in the case of all the reaction conditions studied and appears to tend towards a maximum in conditions (a) and (c). It is observed that, when $V_{0.1}$ is close to or preferably greater than 14 ml/100 g, the conversion is very satisfactory and very close to the maximum observed. For example, a catalyst which has a pore volume at 0.1 micron of approximately 14 ml/100 g enables a $CS_2$ conversion of 50% to be reached. The conversion is more than 10% higher than in the case of the similar catalyst whose $V_{0.1}$ is 12 ml/100 g.

Table 2 below summarizes the conversions measured for four catalysts employed in conditions (a), (b) and (c), which differ in their $V_1/V_{0.1}$ value, with a constant $V_{0.1}$.

TABLE 2

| | $CS_2$ conversion (%) | | |
|---|---|---|---|
| $V_1/V_{0.1}$ | (a) | (b) | (c) |
| 0.44 | 28 | 42 | 30 |
| 0.65 | 42.5 | 59.5 | 46.5 |
| 0.66 | 43 | 60 | 47 |
| 0.78 | 49 | 65 | 51 |

Figure 2:
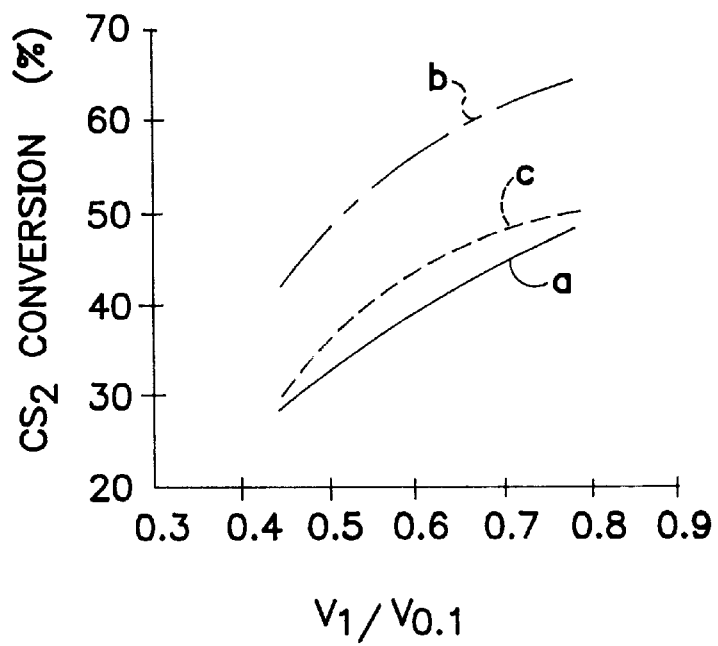

The graph in FIG. 2 shows the variation in $CS_2$ conversion as a function of the $V_1/V_{0.1}$ ratio, with a constant volume $V_{0.1}$, in operating conditions (a), (b) and (c).

The conversion increases with the $V_1/V_{0.1}$ ratio in each of the operating conditions (a), (b) and (c). Catalysts such that $V_1/V_{0.1}$ is higher than 0.65 can be employed advantageously in all the conditions, with a conversion higher than 40% in conditions (a). Catalysts in which $V_1/V_{0.1}$ is higher than 0.7 are still more efficient in all the conditions.

In both tables or on both graphs it is observed that the performances of these catalysts in conditions (c), which correspond to severely aged catalysts, are still outstanding. The drop in conversion between a fresh catalyst and an aged catalyst with an identical $O_2$ content is at most only 15%.

EXAMPLE 2

Alumina powder A is prepared by dehydration of aluminium hydroxides or oxyhydroxides according to the process of French Patent No. 1 108 011.

Another alumina powder B is prepared by aqueous treatment at pH <9 of an active alumina powder obtained by rapid dehydration of hydrargillite according to the process of European Patent Application No. 15 196.

Powders A and B are mixed in proportions such that the sodium content of the mixture, expressed as weight of $Na_2O$, is 2000 ppm by weight.

The mixture of the two powders is then shaped using granulation to form alumina beads of diameter between 3 and 6 mm. The operating conditions of the forming are such that the pore volume $V_{0.1}$ is 19 ml/100 g of catalyst and the $V_1/V_{0.1}$ ratio is 0.82.

A catalysis test is performed by bringing into contact with the catalyst a gas to be treated whose volume composition is identical with that of Example 1. The contact is carried out in a reactor operating isothermally at 320° C., for a contact time of 3 seconds at an oxygen content of 1500 ppm.

The proportion of $CS_2$ converted is 64% at equilibrium.

We claim:

1. A catalyst for treating gases which contain sulphur compounds, for the production of elemental sulfur by hydrolysis of organic sulfur compounds by the Claus reaction, the catalyst comprising alumina-containing porous particles, wherein the particles are from 0.5 to 100% by weight alumina and the cumulative volume created by the pores having a diameter greater than 0.1 μm, $V_{0.1}$, is greater than 12 ml/100g of catalyst, and wherein the cumulative volume created by all pores having a diameter greater than 1 μm, $V_1$, is such that the ratio $V_1/V_{0.1}$ is greater than or equal to 0.65.

2. The catalyst according to claim 1, wherein $V_{0.1}$ is greater than 14 ml/100 g and $V_1/V_{0.1}$ is greater than 0.70.

3. The catalyst according to claim 1, wherein the catalyst has an alumina content in the range of from 0.5 to 100% by weight.

4. The catalyst according to claim 3, wherein the catalyst has an alumina content in the range of from 60 to 99% by weight.

5. The catalyst according to claim 1, wherein the catalyst further comprises up to 40% by weight at least one oxide of a metal selected from cerium, zirconium, silicon, tin, trivalent rare earths, molybdenum, cobalt, nickel and iron.

6. The catalyst according to claim 1, further comprising at least one compound selected from clays, silicates, alkaline-earth metals, ammonium sulfates, ceramic fibers, and asbestos.

7. The catalyst according to claim 1, wherein the particles are formed by agglomeration of a powder containing alumina.

8. The catalyst according to claim 7, wherein the particles are formed by pelletization, by extrusion, or by granulation.

9. The catalyst according to claim 1, wherein the particles are in the form of beads having a diameter in the range of from 1.5 to 10 mm.

10. The catalyst according to claim 9, wherein the particles are in the form of beads having a diameter in the range of from 3 to 7 mm.

11. A method of producing elemental sulfur, comprising treating a gas containing sulfur compounds to provide elemental sulfur from hydrogen sulfide by the Claus reaction in the presence of the catalyst according to claim 1.

12. A method of treating gases containing organic sulfur compounds, comprising treating said gases by hydrolysis in the presence of the catalyst according to claim 1.

13. A method for the treatment of a gas containing sulfur compounds to provide elemental sulfur from hydrogen sulfide by the Claus reaction, comprising passing said gas over a catalyst bed, wherein at least a portion of the catalyst comprises the catalyst according to claim 1.

14. A method for the treatment of a gas containing organic sulfur compounds for the production of sulfur by hydrolysis of the organic sulfur compounds, comprising passing said gas over a catalyst bed, wherein at least a portion of the catalyst comprises the catalyst according to claim 1.

15. A method of treating a gas containing sulphur compounds, comprising passing the gas to be treated over a catalyst bed, for reacting hydrogen sulfide with sulfur dioxide under the conditions of the Claus reaction, the catalyst comprising alumina-containing porous particles, wherein the particles are from 0.5 to 100% by weight alumina and the cumulative volume created by the pores having a diameter greater than 0.1 μm, $V_{0.1}$, is greater than 12 ml/100 g of catalyst, and wherein the cumulative volume created by all pores having a diameter greater than 1 μm, $V_1$, is such that the ratio $V_1/V_{0.1}$ is greater than or equal to 0.65, and wherein the sulfur containing compounds are optionally recovered and converted to elemental sulfur.

16. A method according to claim 15, wherein $V_{0.1}$ in the catalyst is greater than 14 ml/100 g and $V_1/V_{0.1}$ is greater than 0.70.

17. A method according to claim 15, wherein the alumina content of the catalyst is in the range of from 0.5 to 100% by weight.

18. A method according to claim 15, wherein the alumina content of the catalyst is in the range of from 60 to 99% by weight.

19. A method according to claim 15, wherein the catalyst further comprises up to 40% by weight of at least one oxide of a metal selected from the group consisting of cerium, zirconium, silicon, tin, trivalent rare earths, molybdenum, cobalt, nickel and iron.

20. A method according to claim 15, wherein the catalyst further comprises at least one compound selected from the group consisting of clays, silicates, alkaline-earth metals, ammonium sulfates, ceramic fibers, and asbestos.

21. A method according to claim 15, wherein the particles in the catalyst are obtained by agglomeration of a powder containing alumina.

22. A method according to claim 15, wherein the particles in the catalyst are obtained by pelletization, by extrusion, or by granulation.

23. A method according to claim 15, wherein the particles in the catalyst are in the form of beads having a diameter in the range of from 1.5 to 10 mm.

24. A method for treating a gas containing organic sulfur compounds, comprising passing the gas to be treated over a catalyst bed, to perform a hydrolysis reaction of organic sulfur compounds to provide elemental sulfur, the catalyst comprising alumina-containing porous particles, wherein the particles are from 0.5 to 100% by weight alumina and the cumulative volume created by the pores having a diameter greater than 0.1 μm, $V_{0.1}$, is greater than 12 ml/100 g of catalyst, and wherein the cumulative volume created by all pores having a diameter greater than 1 μm, $V_1$, is such that the ratio $V_1/V_{0.1}$ greater than or equal to 0.65, and wherein the sulfur containing compounds are optionally recovered and converted to elemental sulfur.

25. A method according to claim 24, wherein $V_{0.1}$ in the catalyst is greater than 14 ml/100 g and $V_1/V_{0.1}$ is greater than 0.70.

26. A method according to claim 24, wherein the alumina content of the catalyst is in the range of from 0.5 to 100% by weight.

27. A method according to claim 24, wherein the alumina content of the catalyst is in the range of from 60 to 99% by weight.

28. A method according to claim 24, wherein the catalyst further comprises up to 40% by weight of at least one oxide of a metal selected from the group consisting of cerium, zirconium, silicon, tin, trivalent rare earths, molybdenum, cobalt, nickel and iron.

29. A method according to claim 24, wherein the catalyst further comprises at least one compound selected from the group consisting of clays, silicates, alkaline-earth metals, ammonium sulfates, ceramic fibers, and asbestos.

30. A method according to claim 24, wherein the particles in the catalyst are obtained by agglomeration of a powder containing alumina.

31. A method according to claim 24, wherein the particles in the catalyst are obtained by pelletization, by extrusion, or by granulation.

32. A method according to claim 24, wherein the particles in the catalyst are in the form of beads having a diameter in the range of from 1.5 to 10 mm.

33. A two-step process for treating gases which contain hydrogen sulfide with a catalyst comprising:

(a) burning hydrogen sulfide in the presence of a controlled amount of air to convert a proportion of the hydrogen sulphide into sulphur dioxide; and (b) passing the gaseous species obtained in step (a) through converters in series, each converter containing a catalyst bed for reacting hydrogen sulfide with sulphur dioxide to provide elemental sulphur and water, under the conditions of the Claus reaction.

* * * * *